(12) United States Patent
Alvarado et al.

(10) Patent No.: US 7,460,050 B2
(45) Date of Patent: Dec. 2, 2008

(54) CONTROLLING DEVICE USING CUES TO CONVEY INFORMATION

(75) Inventors: Cesar Alvarado, Orange, CA (US);
Alex Louie, Santa Monica, CA (US);
James N. Conway, Jr., Laguna Beach, CA (US); Patrick H. Hayes, Mission Viejo, CA (US)

(73) Assignee: Universal Electronics, Inc., Cypress, CA (US)

( * ) Notice: Subject to any disclaimer, the term of this patent is extended or adjusted under 35 U.S.C. 154(b) by 525 days.

(21) Appl. No.: 10/869,581

(22) Filed: Jun. 16, 2004

(65) Prior Publication Data
US 2005/0066370 A1  Mar. 24, 2005

Related U.S. Application Data

(63) Continuation-in-part of application No. 10/664,629, filed on Sep. 19, 2003.

(51) Int. Cl.
*G08C 19/12* (2006.01)
(52) U.S. Cl. .................. 341/176; 345/170; 400/477; 400/472; 200/5 A; 200/314
(58) Field of Classification Search ............. 341/20, 341/22, 23, 173, 176; 345/170; 400/477, 400/472; 200/5 A, 314
See application file for complete search history.

(56) References Cited

U.S. PATENT DOCUMENTS

| | | | | |
|---|---|---|---|---|
| 5,280,275 A | * | 1/1994 | Kaplan | 345/157 |
| 5,311,175 A | | 5/1994 | Waldman | |
| 5,412,189 A | | 5/1995 | Cragun | |
| 5,450,079 A | * | 9/1995 | Dunaway | 341/23 |
| 5,515,045 A | * | 5/1996 | Tak | 341/23 |
| 5,818,361 A | * | 10/1998 | Acevedo | 341/23 |
| 5,936,554 A | * | 8/1999 | Stanek | 341/22 |
| 5,977,867 A | | 11/1999 | Blouin | |
| 5,977,901 A | * | 11/1999 | Fenner | 341/176 |
| 6,004,049 A | * | 12/1999 | Knox | 400/89 |
| 6,127,961 A | * | 10/2000 | Stacy et al. | 341/176 |
| 6,281,812 B1 | * | 8/2001 | Kim | 341/23 |
| 6,680,677 B1 | | 1/2004 | Tiphane | |
| 6,720,892 B1 | * | 4/2004 | Lachor | 341/22 |
| 6,797,902 B2 | * | 9/2004 | Farage et al. | 200/314 |
| 6,798,359 B1 | * | 9/2004 | Ivancic | 341/23 |
| 2002/0149568 A1 | * | 10/2002 | Kim | 345/170 |

* cited by examiner

*Primary Examiner*—Albert K Wong
(74) *Attorney, Agent, or Firm*—Greenberg Traurig LLP

(57) ABSTRACT

A controlling device, such as a universal remote control, that uses visual, audio, and/or tactile cues, such as sounds, color, patterns, shapes, vibrations, etc., to indicate relationships. Relationships may be between a function key and an intended target appliance for a command transmitted in response to activation of the function key, a user and the controlling device, or a room and the controlling device.

30 Claims, 14 Drawing Sheets

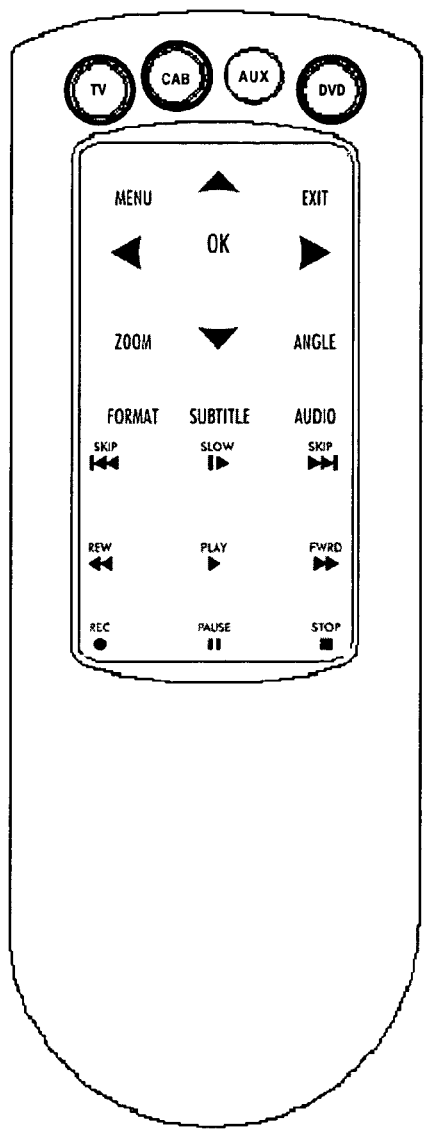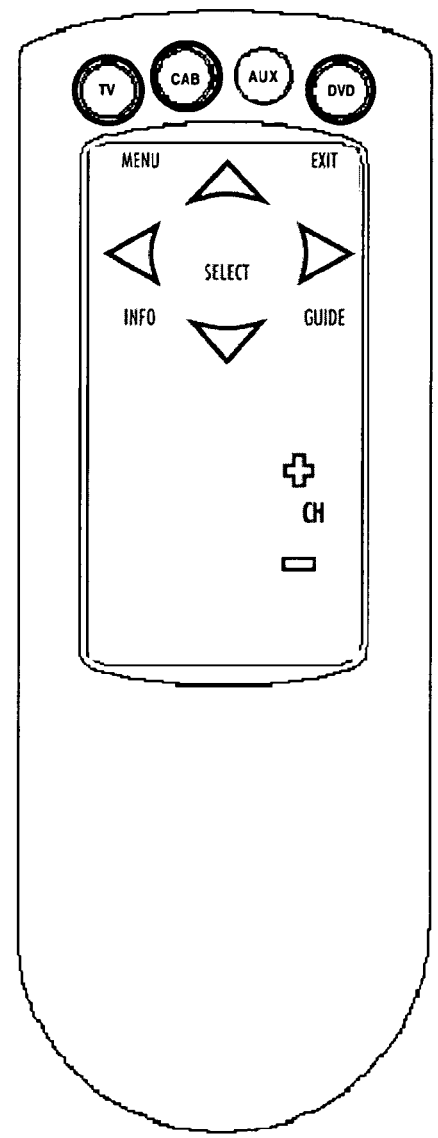
100f
FIGURE 11c
FIGURE 11d

CONTROLLING DEVICE USING CUES TO CONVEY INFORMATION

RELATED APPLICATION DATA

This application is a continuation-in-part of U.S. application Ser. No. 10/664,629 filed on Sep. 19, 2003 entitled "Controlling Device Using Visual Cues To Indicate Appliance And Function Key Relationships," which application is incorporated herein by reference in its entirety.

BACKGROUND

The following relates generally to controlling devices and, more particularly, to a controlling device that uses cues, such as color and/or sound, to convey information to a user of the controlling device.

Manufacturers typically provide a remote control with an appliance and, as such, different appliance types of different manufacturers are often commanded with different remote controls. To minimize the number of individual remote controls a user requires, universal remote controls have been developed. Accordingly, universal remote controls for commanding various functions of various types of appliances of various manufacturers have become quite widespread. By way of example, universal remote controls are described in commonly assigned U.S. Pat. Nos. 4,959,810, 5,255,313 and 5,552,917.

Universal remote control applications for use in connection with hand-held devices such as personal digital assistants ("PDAs") are also known in the art. In this regard, the universal remote control applications effectively turn the host computing device into a universal remote control capable of being used to command various functions of various types of appliances of various manufacturers. By way of example, commonly assigned U.S. Pat. No. 5,778,256 discloses a PDA having a separate infrared generating device connected to its printer port for controlling home appliances and commonly assigned U.S. Published Patent Application No. 2003/0103088A1 discloses a hand-held electronic device, such as a PDA, having a remote control application user interface that functions to display operational mode information to a user and usable, among other things, to setup the remote control application to control appliances for one or more users in one or more rooms, to perform activities, and to access favorites.

Still further, NoviiRemote provides a universal remote control application for use in connection with a Palm brand PDA. In the graphical user interface of the NoviiRemote, groups of function keys are color coded according to a logical category, e.g., volume function control keys are always displayed using a red color, transport function control keys are always displayed using a yellow color, and channel function control keys are always displayed using a green color. While this allows a user to readily discern the various function keys on the graphical user interface, no information is imparted to the user as to which appliance will be controlled upon actuation of a function key. The need for this imparting of information will become apparent from the discussion that follows.

For selecting which of multiple appliances a universal remote control is to command, a universal remote control may allow a user to place the universal remote control into an operational mode whereby the function keys will be used to transmit commands to a "primary" target appliance that has been associated with that operational mode. For example, a "TV" operational mode may be selected to place the universal remote control into an operational mode whereby function keys are used to transmit commands primarily to a designated television, a "VCR" mode may be selected to place the universal remote control into an operational mode whereby function keys are used to transmit commands primarily to a designated VCR, etc. It is to be appreciated, however, that within an operational mode, certain function keys may nevertheless be "locked" so as to transmit commands to a target appliance that does not correspond to the "primary" target appliance that has been associated with that operational mode. For example, volume function keys may be "locked" to an amplifier such that, when the universal remote control is in a "TV" operational mode activation of a volume function key will cause the universal remote control to transmit a volume control command to the designated amplifier, as opposed to the TV.

A universal remote control may also be provided with a "home theater" operational mode, a "user" operational mode (i.e., one established for a particular user), "room" operational mode (i.e., one established for a particular room), or the like (collectively referred to hereinafter as a "home theater" operational mode) which may be selected to place the universal remote control into an operational mode for commanding multiple, target appliances. For example, a "home theater" mode may be established whereby volume function keys are used to transmit volume control commands to an amplifier, channel function keys are used to transmit channel control commands to a cable box, picture control function keys are used to transmit picture control commands to a television, transport control function keys are used to transmit transport control functions to a VCR, etc.

While it may be useful to allow a user to command the operation of multiple appliances from an accessible set of function keys (whether through the use of "locked" function keys and/or "home theater" operational modes), users typically become frustrated as they often forget which appliance is assigned as a target for a function key at any given instant. Accordingly, a need exists for a means whereby a user may quickly discern information concerning a state of the controlling device, for example, a relationship between a function key and an intended target appliance, a current user operational mode of the controlling device, a current room operational mode of the controlling device, etc. Still further, a need exists to allow a user of a remote control which has been previously programmed with macro command sequences, favorite channel tune-ins, etc., to easily determine what action is to be performed by such a programmed key prior to actually issuing the command(s), i.e., be reminded what function has been placed onto a programmable key. Further yet, a need exists on a universal remote control to conveniently identify to a user which specific key functions are available for each device type.

SUMMARY

To address these and other needs, the following generally discloses controlling devices that use cues, such as color and/or sound, to provide information to a user of the controlling device. By way of example, cues may be used to indicate states of the controlling device, such as an appliance and function key relationship, a current user operational mode, a current room operational mode, a function of programmable keys, etc. A better appreciation of the objects, advantages, features, properties, and relationships of the disclosed controlling devices will be obtained from the following detailed description and accompanying drawings which set forth illustrative embodiments which are indicative of the various ways in which the principles described hereinafter may be employed.

BRIEF DESCRIPTION OF THE DRAWINGS

For use in better understanding the exemplary controlling devices reference may be had to the following drawings in which.

DETAILED DESCRIPTION

For allowing a user of a controlling device 100 to discern information concerning the controlling device 100, such as a relationship between a function key and an appliance, a current user operational mode, a current room operational mode, a function of programmable keys, etc., the following describes controlling devices 100 that use cues, such as color and/or sound, to impart the information. As will become apparent, a state represented by the indicating color and/or sound may be direct (e.g., by providing a color indicator directly to a function key or emitting a sound directly upon activation of a function key) or indirect (e.g., by providing a color change to an element, display area, etc. of the controlling device 100 that may be linked—either visually or physically—to the function key if appropriate).

Figure 1:
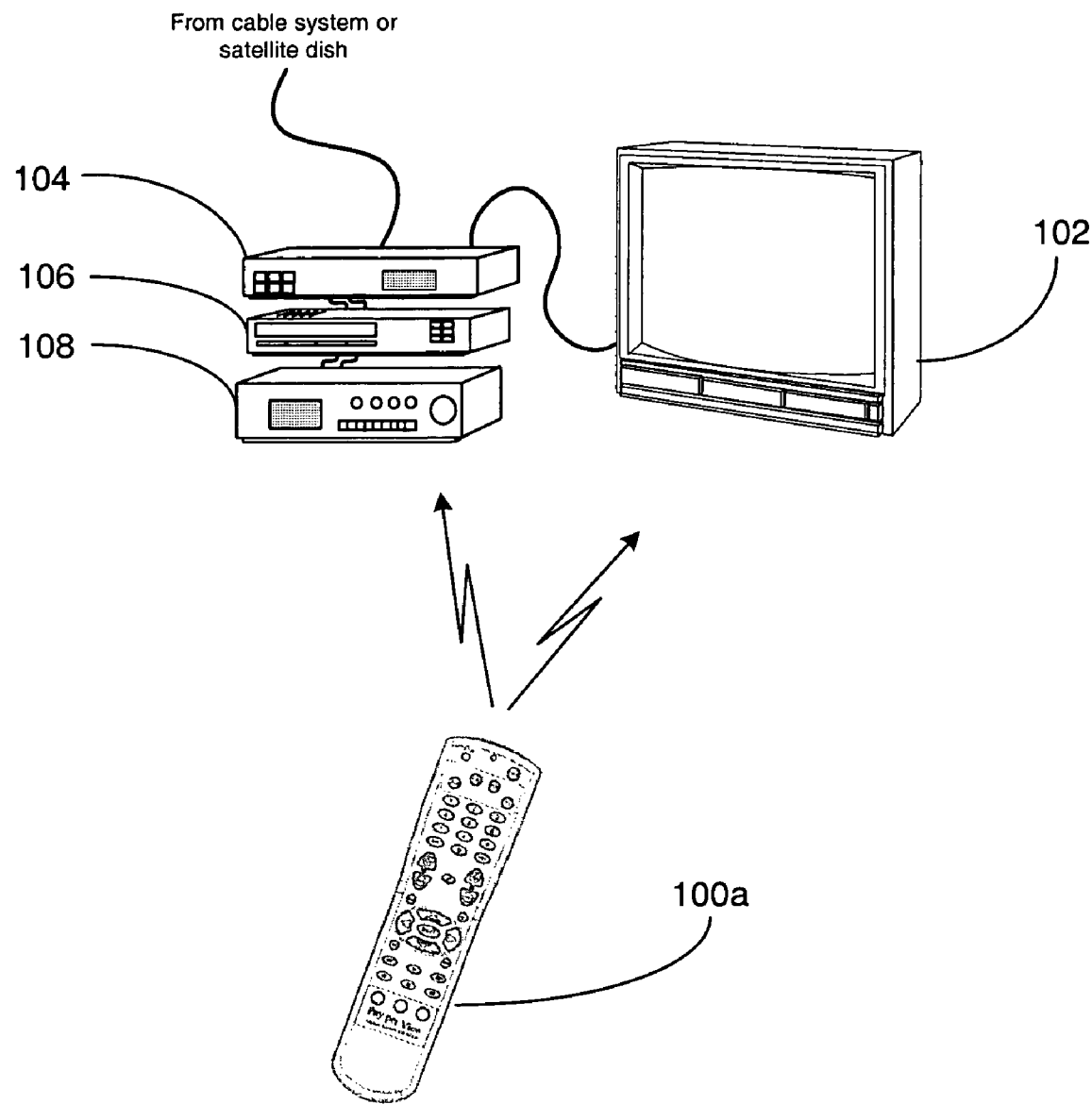
FIG. 1 illustrates an exemplary system in which the exemplary controlling devices may be utilized.

By way of example only, FIG. 1 shows a system including controllable appliances such as a set top box ("STB") 104, a VCR 106, an audio amplifier/receiver 108 and a television 102, as well as a controlling device 100a. The controlling device 100a is capable of transmitting commands to the appliances, using any convenient IR, RF, Point-to-Point, or networked protocol, to cause the appliances to perform operational functions. While illustrated in the context of a STB 104 with VCR 106, audio system 108 and television 102, it is to be understood that controllable appliances can include, but are not limited to, televisions, VCRs, DVRs, DVD players, cable or satellite converter set-top boxes (STBs), amplifiers, CD players, game consoles, home lighting, drapery controls, fans, HVAC systems, thermostats, personal computers, etc.

Figure 2:
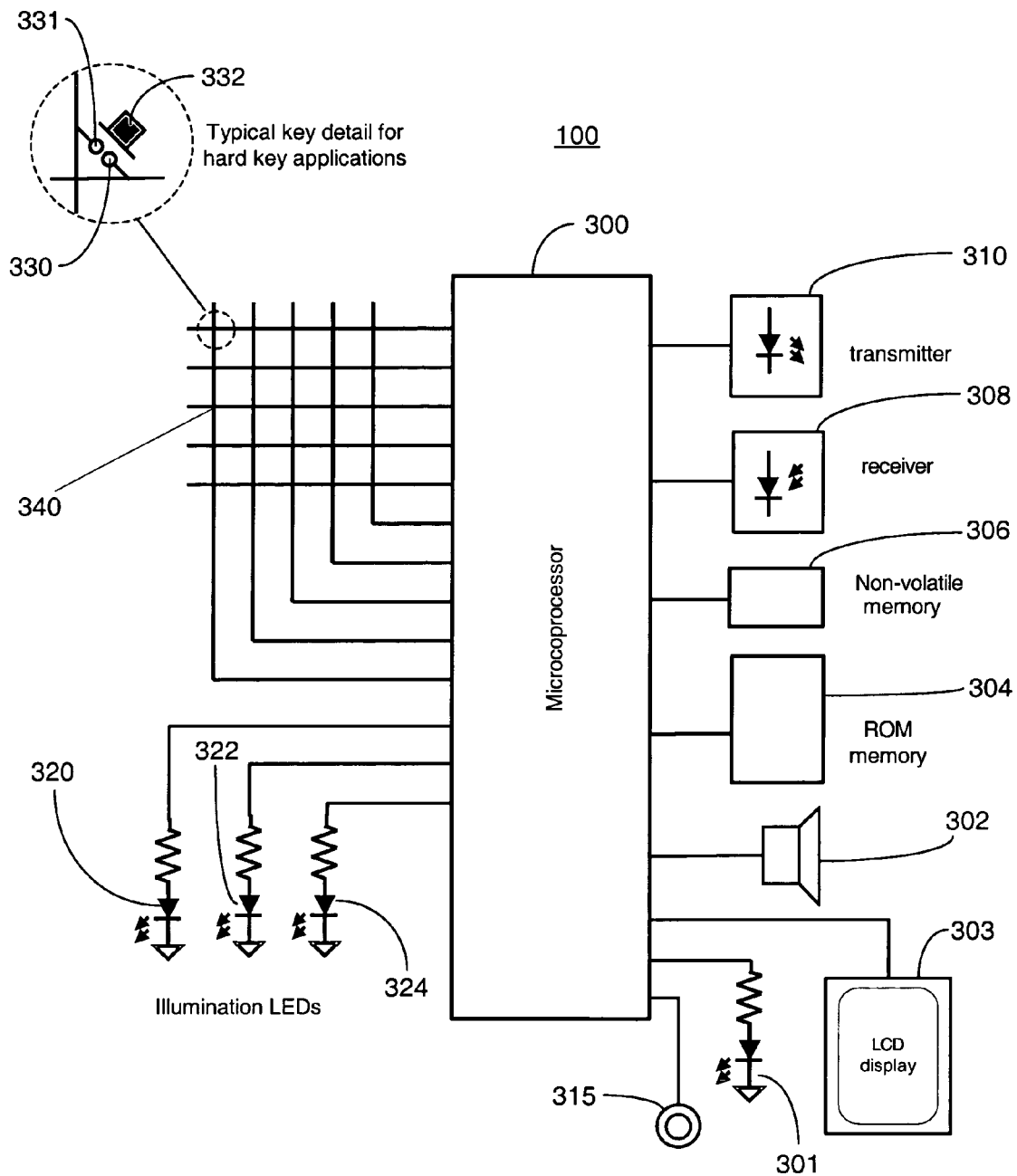
FIG. 2 illustrates a block diagram of exemplary components of the exemplary controlling devices.

For use in commanding the functional operations of one or more appliances, the controlling devices 100 may include, as needed for a particular application, a processor 300 coupled to a ROM memory 304, a key matrix 340 (e.g., hard keys, soft keys such as a touch sensitive surface overlaid on a liquid crystal display (LCD), electroluminescent display (EL), an underlying surface on which key icons are printed or etched, or a combination thereof), transmission circuit(s) 310, receiver circuit(s) 308 and/or transceiver circuit(s) (e.g., IR and/or RF), a non-volatile read/write memory 306, means to provide feedback to the user (e.g., LED 301, display 303, speaker 302, and/or the like), means for receiving additional non-keypress input from the user (e.g., a microphone 315, touch or proximity sensors, motion sensors, biometric input devices such as a fingerprint recognition sensor, and/or the like.), and means for providing visual and/or audio cues to the user, as illustrated in FIG. 2.

More particularly, the means for providing visual and/or audio cues to the user so as to disseminate information to the user may be embodied as key illumination means, a device face illumination means, a sound or voice synthesizer circuit and/or a digital recording and playback circuit (for example to allow a user to playback over speaker 302 sound or voice tags input via microphone 315 or otherwise pre-loaded and/or downloaded into the controlling device). Advantageously, in certain applications the speaker 302 and/or microphone 315 may be associated with voice recording and synthesis circuitry and used as described in greater detail later in this document. It will be appreciated by those of ordinary skill in the art that such voice recording and synthesis circuitry may be included as an integral part of processor 300 or may be provided by attachment of an additional specialized IC such as, for example, those available from Sensory Inc. of Santa Clara, Calif. The key illumination means may be in the form of separate elements, such as LEDs 320, 322, and 324, either directly associated with a hard key matrix or used for indirect general illumination of an area such as in the case of an internally illuminated transparent or translucent display panel, i.e., a display panel that is substantially transparent, or may be integrated as part of the key matrix, for example in the case where the key matrix is implemented using a touch screen display overlaid on an LCD, EL or ink screen printed display panel. In the case where the controlling device 100 includes hard keys, an exemplary molded-in key 332 is shown as operative with key matrix circuit 330, 331. The nature and function of keys 332 on the remote are described in greater detail below.

As will be understood by those skilled in the art, the ROM memory 304 may include executable instructions that are intended to be executed by the processor 300 to control the operation of the remote control 100. In this manner, the processor 300 may be programmed to control the various electronic components within the remote control 100, e.g., to monitor the power supply (not shown), to cause the transmission of signals, control the key illumination means 320, 322, and 324, sound circuits, device face illumination means, etc. The non-volatile read/write memory 306, for example an EEPROM, battery-backed up RAM, Smart Card, memory stick, or the like, may be provided to store setup data and parameters as necessary. While the memory 304 is illustrated and described as a ROM memory, memory 304 can also be comprised of any type of readable media, such as ROM, RAM, SRAM, FLASH, EEPROM, or the like. Preferably, the memory 304 is non-volatile or battery-backed such that data is not required to be reloaded after battery changes. In addition, the memories 304 and 306 may take the form of a chip, a hard disk, a magnetic disk, and/or an optical disk.

To cause the controlling device 100 to perform an action, the controlling device 100 is adapted to be responsive to events, such as a sensed user interaction with the key matrix 340, receipt of a transmission via receiver 308, voice or audio input via microphone 315, etc. In response to an event, appropriate instructions within the memory 304 may be executed. For example, when a function command key is activated on the controlling device 100, the controlling device 100 may retrieve a command code corresponding to the activated function command key from memory 304 and transmit the command code to an intended target appliance, e.g., STB 104, in a format recognizable by that appliance. It will be appreciated that the instructions within the memory 304 can be used not only to cause the transmission of command codes and/or data to the appliances, but also to perform local operations. While not limiting, local operations that may be performed by the controlling device 100 may include displaying information/data, favorite channel setup, macro key setup, function key relocation, user programming of favorite channel selections, etc. A further, local operation is the ability to "lock" function keys across device operational modes as described in U.S. Published Patent Application No. 2003/0025840. Examples of still further local operations can be found in U.S. Pat. Nos. 5,481,256, 5,959,751, and 6,014,092.

Figure 3:
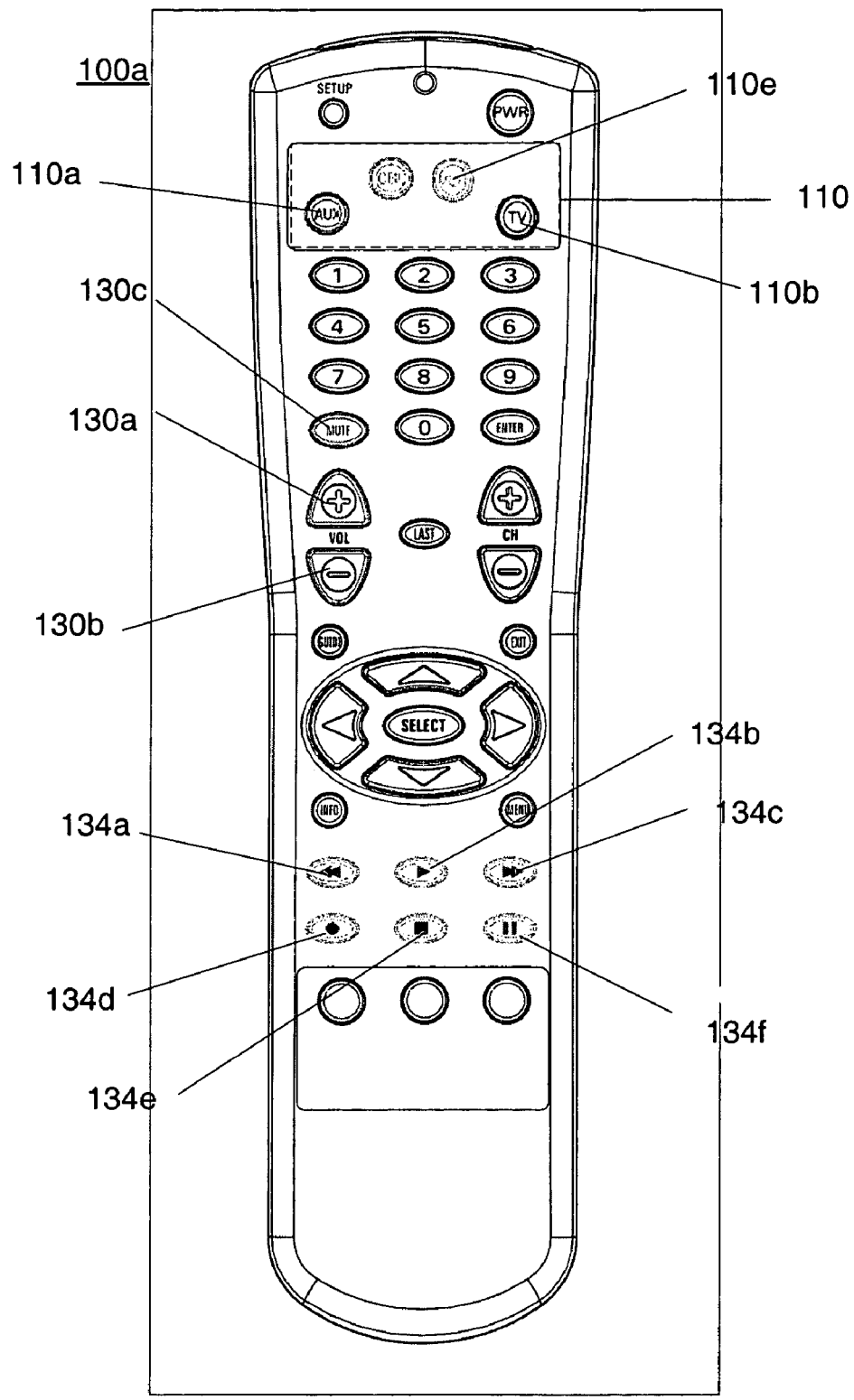
FIG. 3 illustrates an exemplary controlling device having illuminable, hard function keys.

For creating a correspondence between a command code and a function command key, data may be entered into the controlling device 100 that functions to identify an intended target appliances by its type and make (and sometimes model). Such data allows the controlling device 100 to transmit recognizable command codes in the format appropriate for such identified appliances. Typically, intended target appliances are identified for each operational mode of the controlling device 100. By way of example, FIG. 3 illustrates a controlling device 100a having a "TV" operational mode, "AUX" operational mode, "VCR" operational mode, and "CBL" operation mode which are selectable through activation of a corresponding device mode selection key 110. Since methods for setting up a controlling device to command the operation of specific home appliances are well-known, such methods need not be described in greater detail herein. Nevertheless, for additional information pertaining to setup procedures, the reader may turn to U.S. Pat. Nos. 4,959,810, 5,614,906, and 6,225,938. It will also be appreciated that the controlling device 100 may be set up to command an appliance 102 by being taught the command codes needed to command such appliance as described in U.S. Pat. No. 4,623,887. Still further, it will be understood that command codes may be pre-stored in the controlling device 100 or the controlling device 100 may be upgradeable, for example via use of receiver 308.

Figures 4, 4A, 4B, 4C:
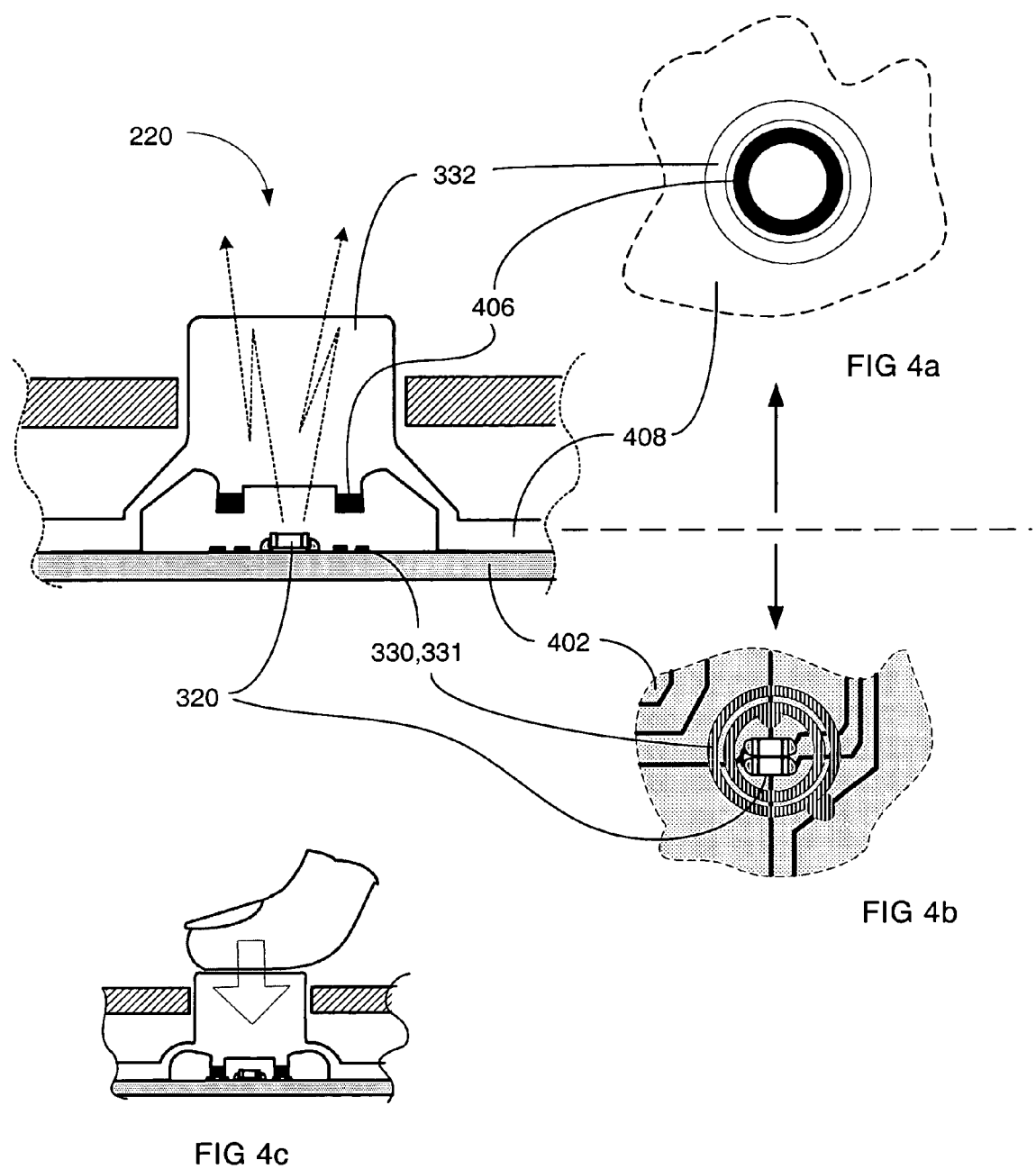
FIG. 4 illustrates a cross-sectional view of the hard function keys of the exemplary controlling device of FIG. 3.

Turning to FIG. 4, there is illustrated an exemplary mechanical construction of an illuminated key 220, such as would be used in connection with the hard keys of the controlling device 100a of FIG. 3. As is known in the art, a controlling device keypad typically comprises a silicon rubber sheet 408 with molded-in key caps 332, in this case of translucent material at least in the area of the keycap(s) 332 which are to be illuminated. The underside of the keycap 332 is equipped with a conductive carbon puck 406 in the shape of a ring. Key contact areas 330 and 331, comprising conductive ink silk-screened onto the printed circuit board 402 in the form of two concentric rings, are positioned directly below the conductive puck 406 such that the key matrix circuit 330,331 is completed when key 220 is depressed as illustrated in FIG. 4c. An LED, such as surface mount type LED 320, is positioned below the translucent keycap 332, e.g., on the circuit board under the center of the keycap 332, such that the key may be illuminated from below when the LED is enabled by the microcontroller 300. Although only a single, multi-colored LED is illustrated for clarity, it will be appreciated that multiple, different colored LEDs may be easily substituted. In the illustrated case, the multi-colored LED may comprise at least two individually-controllable junctions (e.g., two primary colored LEDs) contained in a single package. With such a device, multiple colors are possible (e.g., the two primary colors and the secondary color for the combined primary colors) depending upon which LEDs are enabled.

Figure 5A:
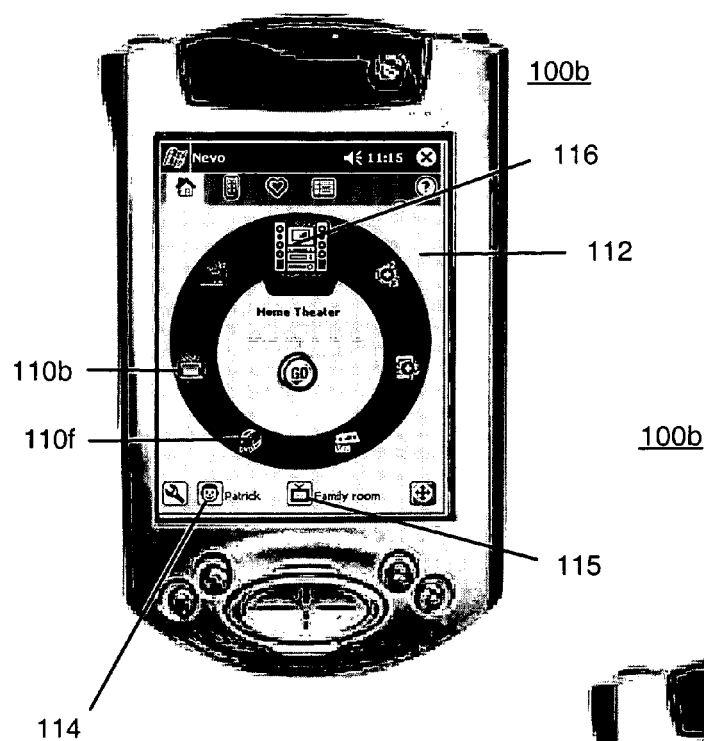
FIG. 5 illustrates an exemplary controlling device having a touch screen display.
Figure 5B:
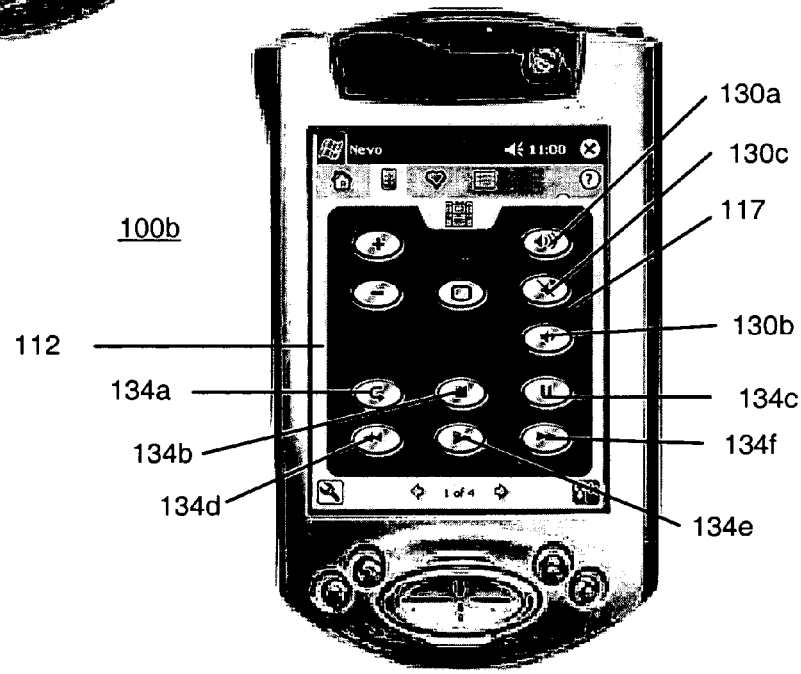

By way of further example, FIGS. 5a-5b illustrate a controlling device 100b having a display 112. In this illustrated example, the display 112 comprises a touch screen that allows a user to interact with the controlling device 100b to, for example, setup the controlling device, select operational modes of the controlling device 100b, etc. In this regard, FIG. 5a shows a selection wheel by which operational mode selection may be accomplished. For example, selecting a "device" icon 110 may place the controlling device 100b in a device operational mode (e.g., TV, VCR, etc.), selecting a "room" icon 115 may place the controlling device 100b in a mode for commanding the operation of appliances in a designated room (e.g., living room, bedroom, etc.), selecting a "user" icon 114 may place the controlling device in a mode for commanding the operation of appliances in a manner preferred by that user (e.g., using their favorites, macros, function key displays, etc.), or selecting a "home theater" icon 116 may place the controlling device 100b in a mode for commanding the operation of multiple appliances within a home theater system. FIG. 5b illustrates a display of example function control keys 117 in a "home theater" page. Such a display-centric controlling device is particularly described and illustrated in commonly owned U.S. application Ser. Nos. 60/264,767, 09/905,423, 09/905,432, and 09/905,396 which are incorporated herein by reference in their entirety.

Figure 6:
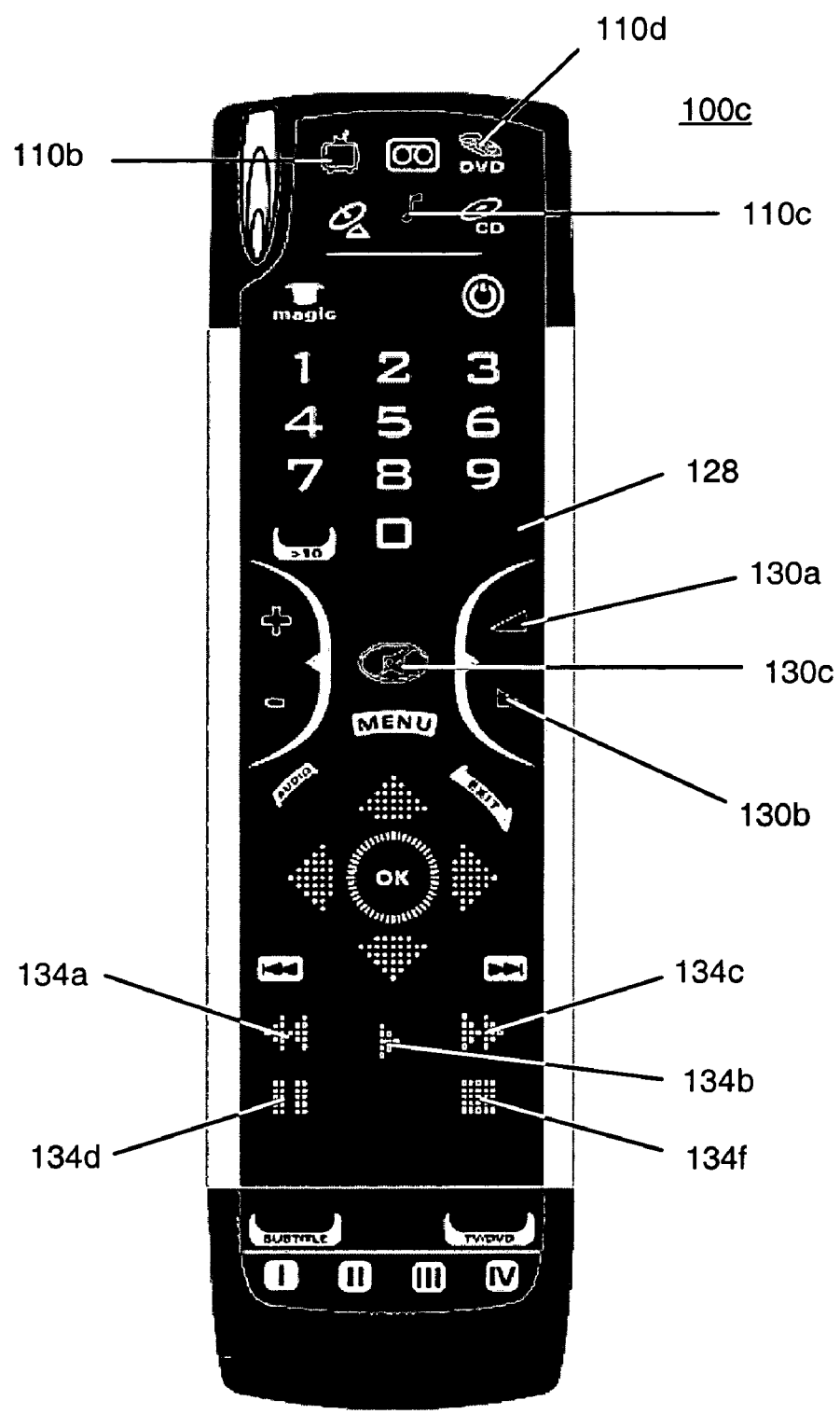
FIG. 6 illustrates an exemplary controlling device having an EL display.

By way of still further example, FIG. 6 illustrates a controlling device 100c which includes an electro-luminescent display 128. Unlike the controlling device 100a illustrated in FIG. 3, which includes silicon rubber keypads protruding through cut-outs in a hard plastic upper housing, the controlling device 100c uses a flexible, segmented electroluminescent ("EL") panel that is overlaid over a dome switch style key matrix. An example controlling device having such an EL panel is particularly illustrated and described in commonly owned U.S. application Ser. No. 10/410,103. Of particular note, the EL panel may be constructed to allow various parts of the display to be independently illuminated using different colors under control of the microprocessor 300 and an EL display interface.

Figure 8:
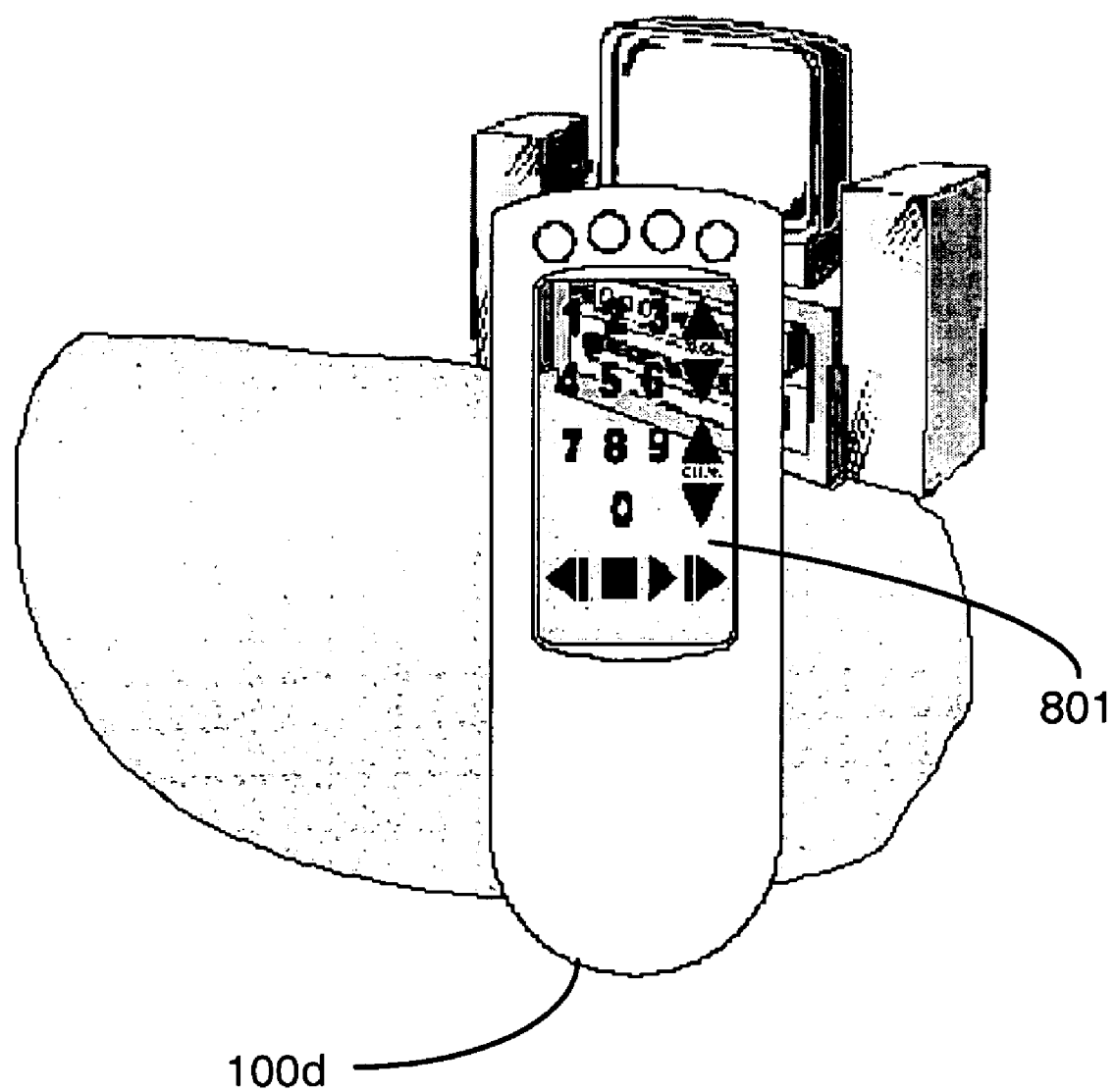
FIG. 8 illustrates an exemplary controlling device having an internally illuminable, transparent device face.
Figure 9:
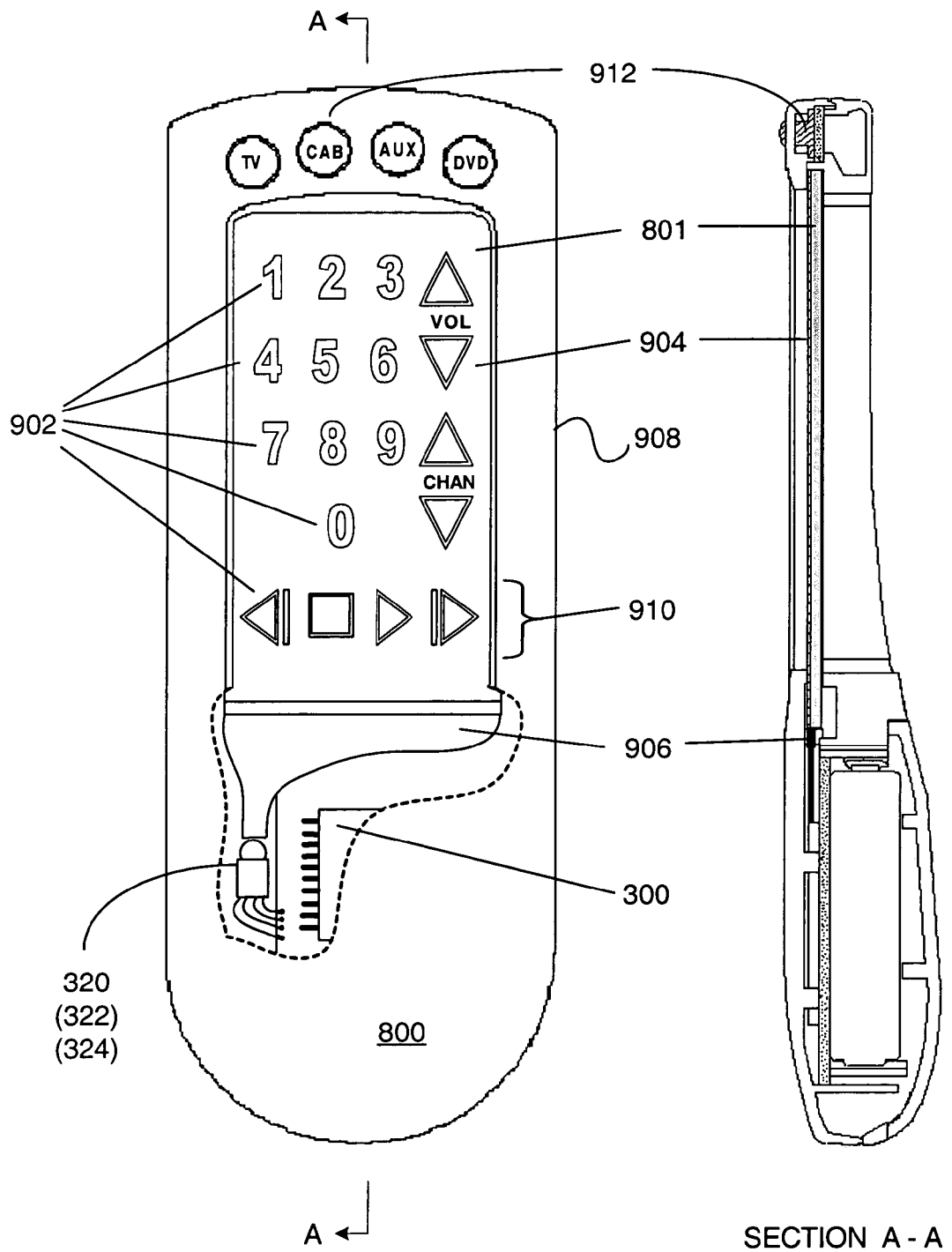
FIG. 9 illustrates the construction and key configuration of an exemplary controlling device having an internally illuminable, transparent device face.

Yet further, FIGS. 8 and 9 illustrate a controlling device 100d having a display face 801 made from a translucent light conducting material (i.e., a face that allows for the passage of at least some incident light). The display face 801 is preferably made from a light conducting material and includes an overlay with touch-sensitive keys. It will be understood that various materials with differing degrees of light pass-through may be used in the construction of the translucent display face

801 without departing from the spirit of this invention. Accordingly the term "translucent" is intended to include all possible degrees of light transmissivity and dispersion, spanning the gamut from fully transparent (100% transmissivity with no dispersion or scattering) through almost opaque (low tranmissivity and/or high dispersion/scattering.)

Turning to FIG. 9, display face 801 is printed or etched with icons 902 representative of various controlling device keys, e.g., operational mode and function keys. Overlaying display face 801 is a touch panel 904 comprising a matrix of touch sensitive segments corresponding to the printed icons, such that touches to the area of each individual icon form uniquely identifies inputs to microcontroller 300 for causing the controlling device to perform an activity, such as transmitting commands to an appliance, entering a mode of operation, etc., all of which is well known in the art. Where desired, hard keys, for example device mode selection keys 912 in the illustrated embodiment, may also be provided.

Display face 801 may be internally illuminated by one or more sources of light energy—either visible or outside of the visible spectrum. In the illustrated example, the sources of light energy comprise LEDs 320, 322, 324 which transmit light via a light pipe 906 (comprised, for example, of optical fibers) attached to the bottom edge of the display face. It will be appreciated that in general LEDs 320-324 may comprise separate individually colored LEDs or may comprise a single multi-color capable component as illustrated. In this manner, the entire display face 801 may be illuminated in different colors by energizing different LED groups and/or different elements in a multi-colored LED group. In an alternative embodiment (not illustrated) illumination LEDs may be positioned around the circumference of the display face 801, for example within openings formed in the sides of the material from which the case 908 is formed. Again, these LEDs may include groupings of one or more single colored LEDs and/or multi-colored LEDs distributed about the outside of the display face 801. In this embodiment, when one or more LED groupings are illuminated, an area of display face 801 is illuminated the corresponding color. The display face 801 may thus be simultaneously illuminated in multiple, different color zones by energizing different combinations of LED groups and/or by energizing different combinations of elements in a multi-colored LED group.

Additional methods for selectively illuminating the display face internally may be possible without departing from the spirit and scope of the current invention, for example, a single color LED (i.e., a white light LED) may be used in conjunction with one or more color filters and/or lenses mechanically operable to cause different illumination colors or hues within the display face. It will also be understood that well known translucent LCD methods may be used to accomplish the various aspects and features contemplated by the current invention, either independently or in conjunction with other display illumination techniques described herein. For example, translucent LCD's effectively mask or filter light passing through portions of the display, and may be used in conjunction with light sensitive inks and other illumination and coloring techniques described herein to present a rich functional environment to a user or users.

The ability to independently illuminate (or in the case of a translucent LCD, mask or filter) various parts of the controlling device 100, e.g., the keys and/or display, with different light wavelengths (i.e., light colors) may be used to advantageously provide a user of the controlling device 100 with a visual indication as to which appliance a command should be transmitted to (e.g., the intended target) when a function key is activated. For example, a color association between a function key and an appliance may be used to provide a user with information indicative of which function keys are locked to which appliances across the various "device" modes. Still further, the color association between a function key and an appliance may be used to provide a user with information indicative of which function key is assigned to which appliance when multiple appliances are controllable from a user interface, e.g., when the controlling device 100 is in a "home theater" operational mode. Yet further, the function keys and/or function key background may be illuminated a color to indicate in which user operational mode or which room operational mode the controlling device 100 is currently placed into. For example, the display face 801 may be illuminated red when the controlling device is currently in one user's operational mode (e.g., the remote control is configured to use their favorites, macros, etc.) and may be illuminated green when the controlling device is placed into another user's operational mode.

As noted, a color indicative of an intended target appliance that is associated with a function key, a user mode, or a room mode may be achieved by illuminating one or more appropriately colored LEDs that are associated with the function key (e.g., in the case of "hard" keys) or display face (e.g., in the case of either "hard" or "soft" keys), by displaying an icon, area surrounding an icon, etc. with the appropriate color (e.g., in the case of "soft" keys), or by illuminating one or more appropriately colored segments of an EL panel that are associated with the function key (e.g., in the case of "EL display" keys). In any of these instances, a cue (color or sound) that is selected so as to be indicative of an intended target appliance, user operational mode, or room operational mode may be predefined or user-selectable (e.g., a user may select a color or sound from a menu, by stepping through various color or sound choices, by being downloaded and assigned, etc.). Furthermore, the absence of a color and/or sound may also be used to provide information to the user.

By way of example, FIG. 3 illustrates a controlling device 100*a* having hard keys in which the volume control function keys 130 (e.g., volume up 130*a*, volume down 130*b*, and mute 130*c* function keys) have as their intended target the appliance designated as the intended target when the appliance is in the "AUX" device mode. The relationship between the function keys and the "AUX" device as the intended target may be presented to the user by causing each of the volume control function keys 130 to be illuminated, by means of illuminating the appropriate LED(s), with a red color. In this case, the user may simply know that the color red is indicative of a function key having the "AUX" device as its intended target. The relationship between the function keys and the "AUX" device as the intended target may also be presented to the user by causing the "AUX" device mode selection key 110*a* to be optionally illuminated the same color as the function keys that have the "AUX" device as the intended target, e.g., by also causing the "AUX" device mode selection key 110*a* to be illuminated red. Similarly, a relationship between the transport control function keys 134 (e.g., the rewind 134*a*, play 134*b*, fast forward 134*c*, record 134*d*, stop 134*e*, and pause 134*f* function keys) and the "VCR" device as the intended target may be presented to the user by causing each of the transport control function keys 134 to be illuminated with a green color. Again, the "VCR" device mode selection key 100*e* may be illuminated with the same green color to allow a user to discern the relationship between the device mode intended target appliance and the function keys 134.

By way of still further example, FIG. 5*b* illustrates a "home theater" page of the controlling device 100*b* in which the volume control function keys 130 (e.g., volume up 130*a*, volume down 130b, and mute 130c function keys) have as their intended target the appliance designated as the intended target when the appliance is in the "TV" device mode. The relationship between the function keys and the "TV" device as the intended target may be presented to the user by causing each of the volume control function keys 130 (or areas surrounding or in the vicinity of the volume control function keys 130) to be illuminated, by means of displaying, a red color. In this case, the user may simply know that the color red is indicative of a function key having the "TV" device as its intended target. The relationship between the function keys and the "TV" device as the intended target may also be presented to the user by causing the "TV" device mode selection key 110b to be optionally illuminated the same color as the function keys that have the "TV" device as the intended target, e.g., by also causing the "TV" device mode selection key 110b of the device selection page, illustrated in FIG. 5a, or appropriate area(s) adjacent thereto, to be illuminated red. Similarly, a relationship between the transport control function keys 134 (e.g., the rewind 134a, play 134b, fast forward 134c, stop 134e, and pause 134f function keys) and the "DVD" device as the intended target may be presented to the user by causing each of the transport control function keys 134 (or areas surrounding or in the vicinity of the transport control function keys 134) to be illuminated with a green color. Again, the "DVD" device mode selection key 100f may be illuminated with the same green color, for example in the mode selection page of FIG. 5a, to allow a user to discern the relationship between the device mode intended target appliance and the function keys 134.

By way of yet another example, FIG. 6 illustrates a controlling device 100c having an EL display in which the volume control function keys 130 (e.g., volume up 130a, volume down 130b, and mute 130c function keys) have as their intended target the appliance designated as the intended target when the appliance is in the "AMPLIFIER" device mode. The relationship between the function keys and the "AMPLIFIER" device as the intended target may be presented to the user by causing each of the volume control function keys 130 (or areas surrounding or in the vicinity of the volume control function keys 130) to be illuminated, by means of illuminating the appropriate EL segment(s), with a red color. In this case, the user may simply know that the color red is indicative of a function key having the "AMPLIFIER" device as its intended target. The relationship between the function keys and the "AMPLIFIER" device as the intended target may also be presented to the user by causing the "AMPLIFIER" device mode selection key 110c to be optionally illuminated the same color as the function keys that have the "AMPLIFIER" device as the intended target, e.g., by also causing the "AMPLIFIER" device mode selection key 110c, or appropriate area(s) adjacent thereto, to be illuminated red. Similarly, a relationship between the transport control function keys 134 (e.g., the rewind 134a, play 134b, fast forward 134c, stop 134e, and pause 134f function keys) and the "DVD" device as the intended target may be presented to the user by causing each of the transport control function keys 134 (or areas surrounding or in the vicinity of the transport control function keys 134) to be illuminated with a green color. Again, the "DVD" device mode selection key 100f may be illuminated with the same green color to allow a user to discern the relationship between the device mode intended target appliance and the function keys 134.

If, for example, the transport control function keys 134 and the volume control function keys 130 are locked to their respective devices, the transport control function keys 134 and the volume control function keys 130 may continue to be illuminated using an appropriate device-indicative color even when the controlling device 100 is placed into others of its various home theater, room, or device operational modes. It will be appreciated that the LEDs, EL segments, display, etc. need not be constantly illuminated in a device-indicative color but that a key or the like may be activatable by the user to temporarily illuminate the LEDs, EL segments, display, etc. in an appropriate color given the present operational mode of the controlling device 100 and the intended target appliance(s) of the function keys within that operational mode.

In the case of remote control 100d illustrated in FIGS. 8 and 9, use of the alternative embodiment comprising LEDs positioned around the periphery of the display together with the grouping of key functions into appropriate zones, e.g. the transport function key group 910 of FIG. 9, permits selective illumination of keys using device-indicative colors.

Figure 10:
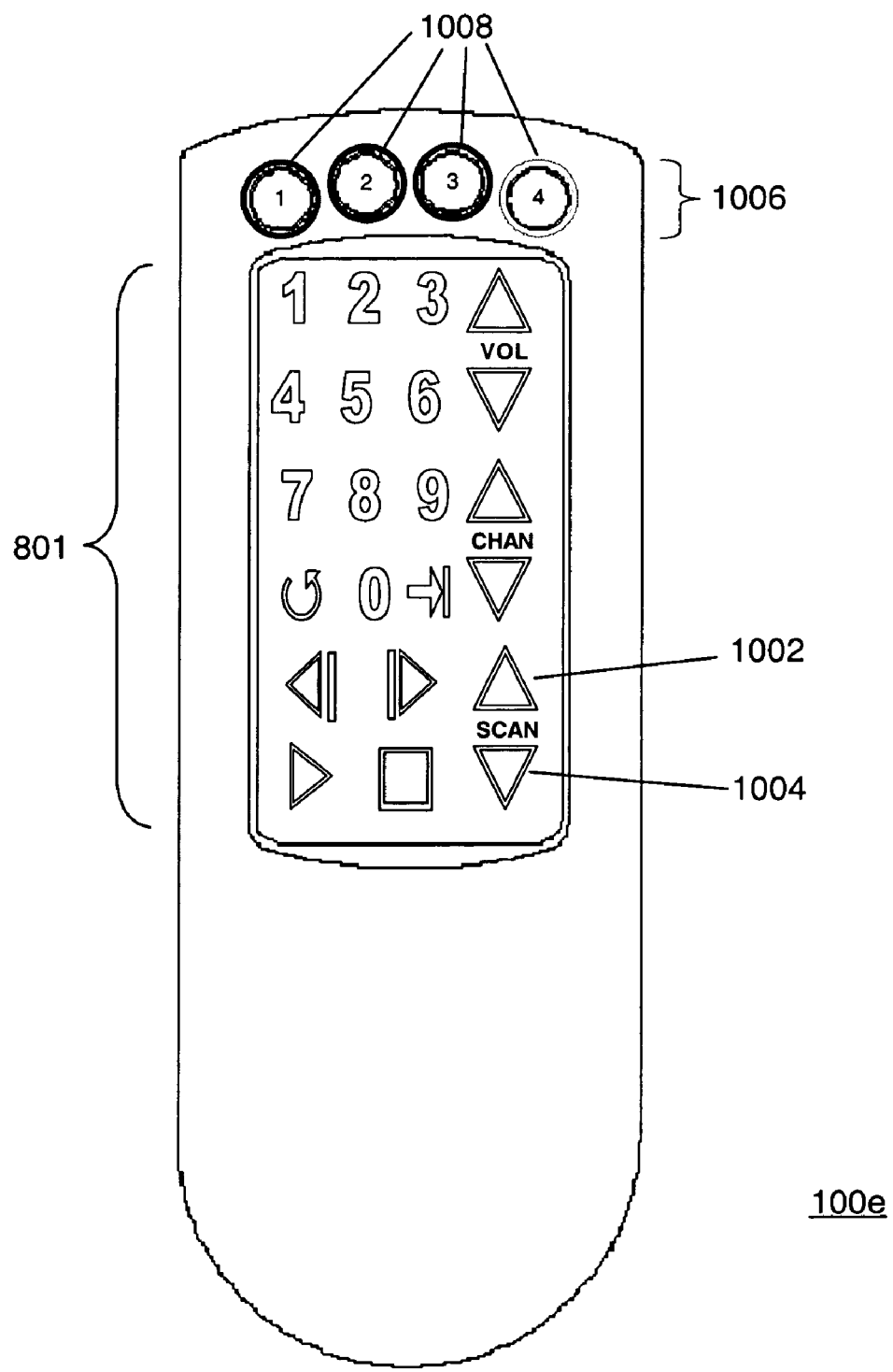
FIG. 10 illustrates a second exemplary key configuration of a controlling device having an internally illuminable, transparent device face.

In the case where operational modes are to be indicated to the user, such as user operational modes or room operational modes, it will be appreciated that all or part of an entirety of the functions keys, a display, an EL panel, or display face may be illuminated as described above to cause an information providing color to be presented to the user. By way of further example of indication of a user operational mode, remote control 100e of FIG. 10, configured for use with a satellite set top box including an integrated digital video recorder ("DVR"), includes channel scan buttons 1002, 1004 which may be programmed by a user to scan back forth through a favorite subset of the greater universe of all available channels. Remote control 100e also supports up to four individual users, each with their own set of favorite channels, via four user selection buttons 1006. The user currently selected may advantageously be indicated by the illumination of the display panel in a color corresponding to an indicia 1008 (e.g., a colored ring) associated with that user's selection button.

Figures 11A, 11B:
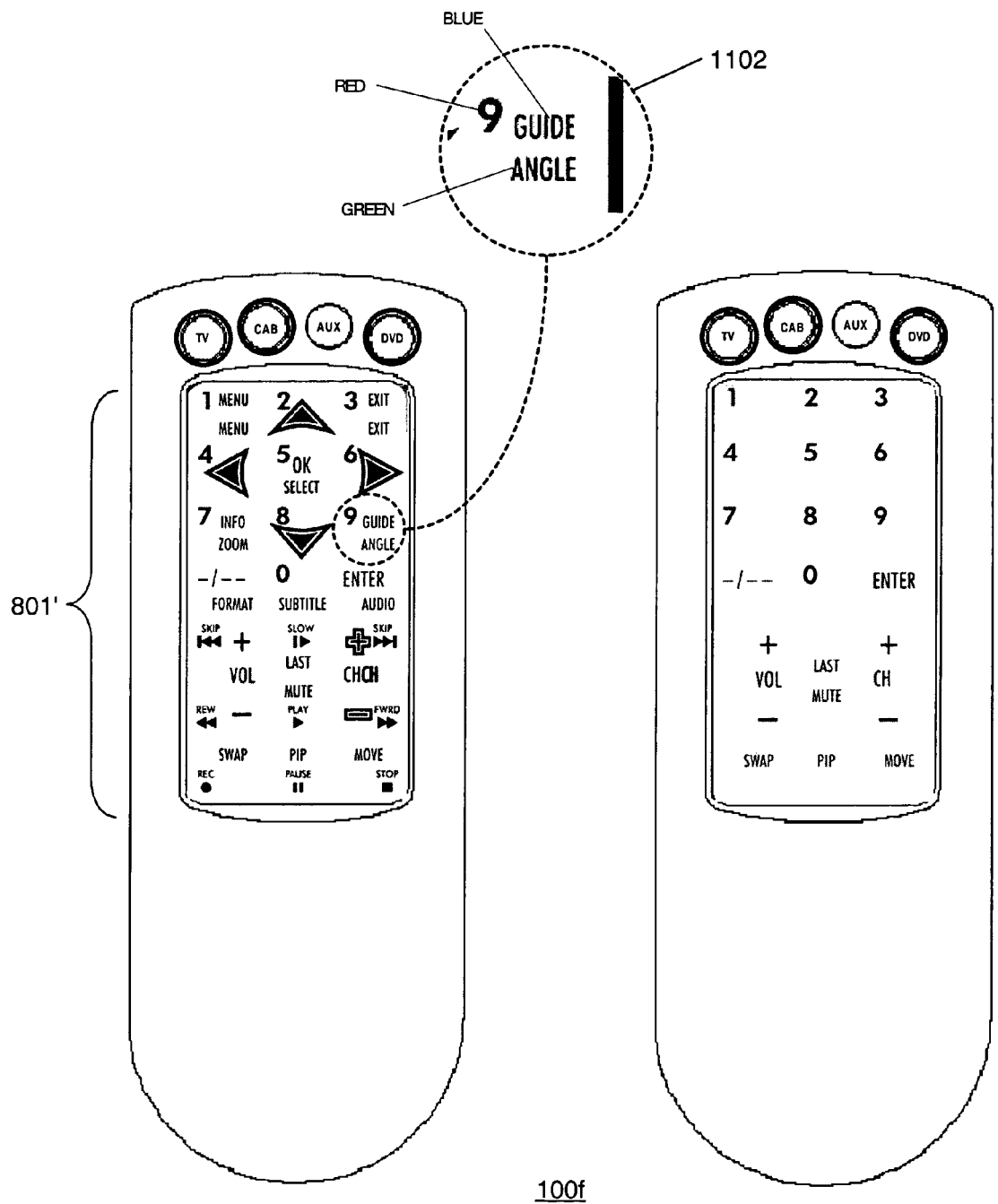
FIG. 11 illustrates a third exemplary configuration of a controlling device having an internally illuminable, transparent device face, whereby key icons may be selectively highlighted to indicate different functionality in different modes of operation.

In yet another embodiment, light of varying color, selective activation of LCD elements, or other selective illumination techniques as described above may be used to effect the display of different icons or labels for a single physical key location, depending upon the device to be controlled. Referring to FIGS. 11a through 11d, in a remote control 100f of similar construction to that already described in conjunction with FIG. 9, display panel 801' may be screen printed with icons using several different ink formulations, each ink responsive to a specified light wavelength or range or light wavelengths (i.e., the visible light color). For example a single key location label 1102 may include the label "9" printed in an ink responsive to red light, the label "Guide" in an ink responsive to blue light, and the label "Angle" in an ink responsive to green light. Illumination of the display panel in each of these respective colors may thus be used to bring different sets of labels or icons into visual prominence, depending upon the current device being controlled. By way of example, FIG. 11b illustrates the appearance of display panel 801' when the display panel 801' is internally illuminated with red light (in the illustrated example, the user interface displayed corresponds to the TV device mode in which the labels printed in ink responsive to red wavelengths—e.g., labels having a reddish color—are more prominently displayed visually relative to the other labels); FIG. 11c illustrates the appearance of display panel 801' when the display panel 801' is internally illuminated with green light (in the illustrated example, the user interface displayed corresponds to the DVD device mode in which the labels printed in ink responsive to green wavelengths—e.g., labels having a greenish color—are more prominently displayed visually relative to the other labels); and FIG. 11d illustrates the appearance of display panel 801' when the display panel 801' is internally illuminated with blue light (in the illustrated example, the user interface displayed corresponds to the Cable device mode in which the labels printed in ink responsive to blue wavelengths—e.g., labels having a bluish color—are more prominently displayed visually relative to the other labels).

Although the renderings in FIGS. 11*b* through 11*d* for convenience of illustration do not depict the non-active icons or labels at all, it will be appreciated that in practice these labels may still be faintly visible: it is the intent of the invention to bring the active icon or label into prominence, not to render the non-active icons and labels completely invisible, although such may be possible. In general, to achieve the benefits of this invention it is sufficient that the non-active icons and labels be of low perceived visibility relative to the icons or labels associated with the active key functions.

It will be understood by those skilled in the art that the particular methods and techniques used to effect responsiveness to light energy in a display element may include phosphorescence, fluorescence, reflectivity, diffusion, filtering, absorption, lasing, and other techniques. In this regard, combinations of conventional and/or photochromatic inks may be utilized to imprint labels on a display element and appropriate corresponding sources of energy utilized to bring desired user interface elements into prominence. Additionally, as described above, transparent (or translucent) LCD techniques which make use of selective masking or filtering of ambient light passing through the display panel may be used, either alone or in conjunction with the above techniques to create areas of selective prominence on the display panel to present to a user. Furthermore it will be appreciated that the light wavelength, range of wavelengths, or other electromagnetic energy signals used to interact with a given display element may differ from the actual visible light color experienced by a user, for example, an ultraviolet (UV) light source may be used to illuminate a fluorescent display element. Another strategy is to use interference filters to change viewing angles so that the color changes with the viewing angle. Still further, it is contemplated that heat energy may be used to cause the inks of certain labels, e.g., imprinted using thermochromic inks, to appear more prominently relative to other labels.

It will also be appreciated that one goal of the present invention is to maximize the transparency of the display panel 801 while still allowing for various display portions to be selectively brought to prominence to enhance user interaction. As such, those skilled in the art will understand that varying levels of transparency for the display panel are possible given appropriate combinations of the illumination source and the particular chemical composition, fabrication, or physical makeup of each icon and/or label.

While the foregoing describes controlling devices 100 that use color to disseminate information, it will be understood and appreciated that various types of sensory indicia (which may be used in addition to or in lieu of color), including but not limited to visual indicia, tactile indicia, and auditory indicia, all as more fully described below, may be used to similarly indicate relationships between function keys and appliance-centric keys, the controlling device and user operational modes, and/or the controlling device and room operational modes. For example, in addition to color, other non-alphanumeric visual indicia may be provided by controlling the tint, contrast, pattern (e.g., imposing a crosshatch or other pattern on all function keys associated with a particular appliance), shape (e.g., surrounding each function key with a shape representing the associated device), or brightness of displayed function keys and/or area(s) visually associated with function keys, a display face, etc. While not preferred, it is also contemplated that alphanumeric visual indicia may be used for this same purpose, i.e., by providing a readable icon or tag to a function keys and/or area(s) visually associated with function keys.

Additionally, tactile indicia such as provided by haptic feedback methods may be used to similarly indicate relationships between keys functions and modes of the controlling device. For instance, a vibration mechanism integrated with the controlling device (as is well known in the art) may be caused to exhibit various vibrational modes (i.e., discrete vibration modes, intermittent vibration patterns, etc.) indicative of an appliance to be controlled, a particular function key, a particular room operational mode, or a particular user operation mode. Such tactile indicia may be particularly advantageous for visually impaired users, or for operation of the controlling device in low-light and/or out of direct view conditions. Also, as described more fully below, a haptic feedback mechanism integrated with a particular key or keys of the controlling device (i.e. a two detent key) may be used to trigger another (possibly different) sensory indicia (i.e., color LED or audio feedback) which provides information prior to initiating a command from the controlling device via a full depress of the key. Yet further, information may be provided by using a distinct audible sound tag. Distinction between the sound tags may be achieved by allowing sounds to repeat in different numbers, emitted using different frequencies, and/or emitted in different sequences/patterns. Distinct sound tags may also be generated using a voice synthesizer. Such sound tags may also be in the form of sound labels that may be recorded via microphone 315 of the controlling device and later played back via speaker 302 of the controlling device. Again, recorded sound tags may be user spoken voice labels. In this manner, an event such as activation of a function key, movement of the controlling device, etc. may cause the controlling device to emit a sound tag whereby information is disseminated to the user.

In some instances it may also be desirable to allow a user to hear a sound tag prior to an action that is associated with that sound tag being performed by the controlling device. For example, function keys may be provided that, when depressed a first time cause their associated sound tag to be emitted from the remote control and then, when pressed a second time, cause the remote control to perform an action that has been associated with that function key, e.g., to cause the transmission of programmed macro commands. Preferably, the action is performed only if the function key is activated a second time within a predetermined time-out period which is initiated after the first activation of the function key which caused the emission of the sound tag. Yet further, function keys may be provided that cause the emission of a sound tag when touched or slightly depressed and which cause the action associated with that function key to be performed when the function key is more fully depressed. Alternatively, function keys may be provided that when "tapped," i.e., pressed only briefly, cause the emission of a sound tag and when pressed and held down cause the action associated with that function key to be performed. In all instances, it is to be understood that the use of sound tags allows a user to identify what function or functions will be performed in response to activation of a function key which is particularly useful in the case of macro keys which are usually unlabeled or blank programmable keys provided on a controlling device.

Figure 12:
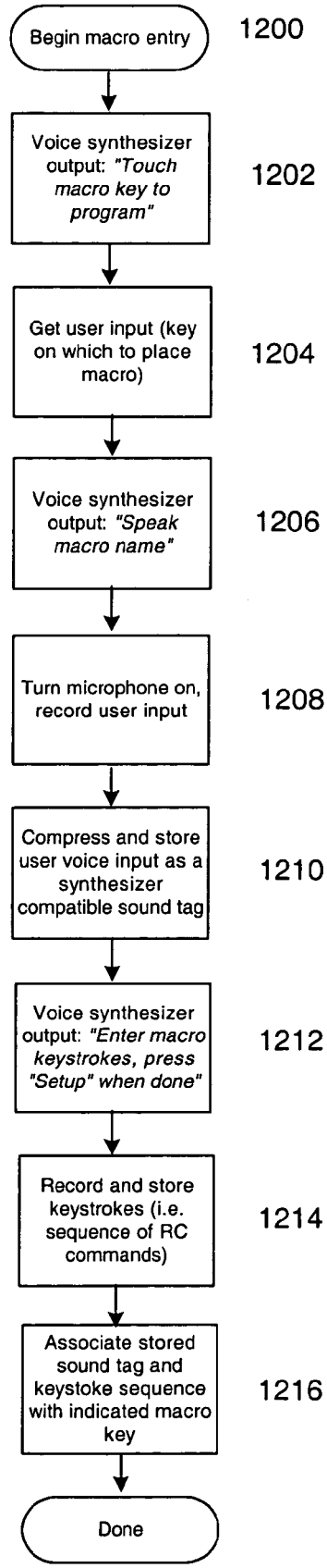
FIG. 12 illustrates an exemplary method for recording user voice input to be used as a sound tag to identify a macro command sequence.
Figure 13:
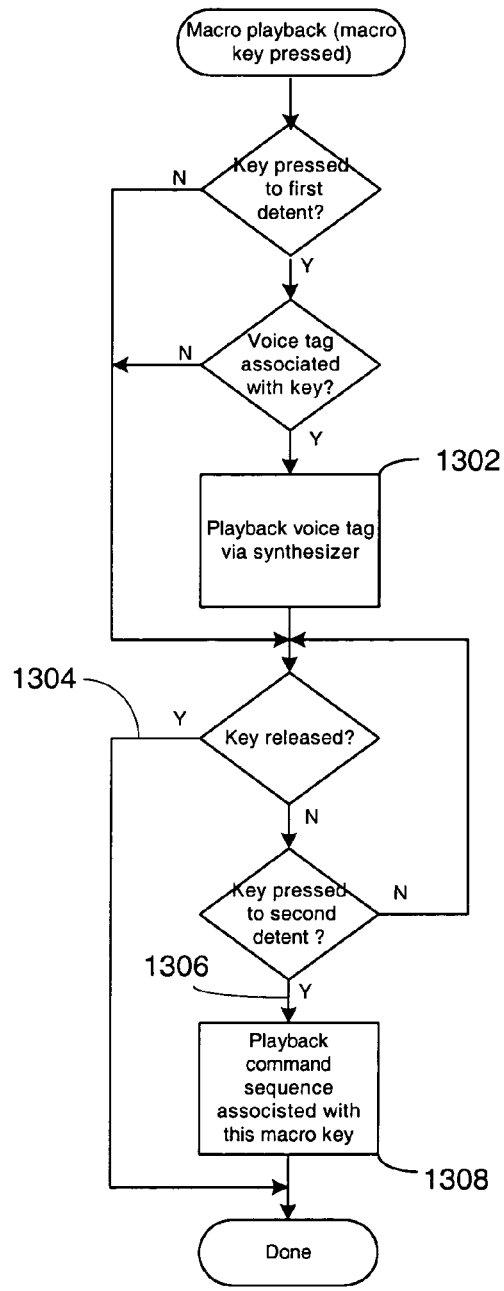
FIG. 13 illustrates an exemplary method for initiating playback of a sound tag to identify a macro command sequence.
Figure 14:
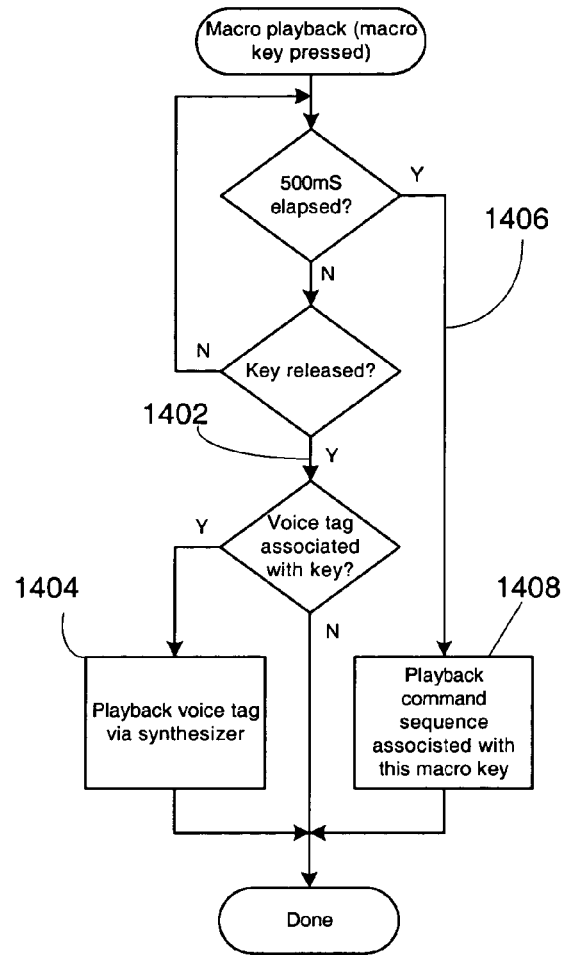
FIG. 14 illustrates an alternative exemplary method for initiating playback of a sound tag to identify a macro command sequence.

By way of further example FIGS. 12 through 14 illustrate steps performed by possible embodiments of such a macro labeling function. Referring to FIG. 12, once the macro definition entry state has been initiated 1200 (methods for entering into a macro definition state are well known in the art, see for example U.S. Pat. Nos. 5,959,751 or 6,587,067), taking advantage of the speech synthesizer capability, in this example, the user is audibly prompted to identify which macro key is to be programmed (1202/1204). Thereafter, the user is prompted to record a spoken phrase by which this macro sequence will be identified in the future (1206/1208/1210). It will be appreciated that the duration of microphone enablement (1208) may be either via the user pressing and releasing a "record" button, or may be automatic via use of a timer, ending upon cessation of speech input for more than a threshold time period, etc. After the sound tag is acquired, the user is prompted to enter the command sequence (i.e., macro) to be programmed (1212/1214). Entry of the command sequence (1214) may be similar to that described in the above referenced U.S. Pat. Nos. 5,959,751 or 6,587,067. Upon completion of command sequence entry, the stored command sequence and sound tag is associated (1216) with the designated macro key for future playback. It is also to be appreciated that this order is not meant to be limiting and that the labeling may be performed, for example, to an already programmed macro.

Turning now to FIG. 13, there is illustrated one method for implementing sound tagged macro playback suitable for use in conjunction with a macro key that is mechanically adapted to offer two detent (light/heavy) key press action as is well known in the art. The key may thus be configured to be responsive to playback the sound tag (1302) if lightly depressed or cause the controlling device to playback the command sequence (1308) if fully depressed. As can be seen, a user may lightly press and release (1304) the key in order to playback only the sound tag, or may fully depress (1306) the key in order to initiate the action (command playback).

FIG. 14 illustrates an alternative embodiment of this feature which may be used in conjunction with keys that are not adapted to offer double action. In this case, the time duration of the user keypress is measured. If the user only "taps" (1402) the key (i.e., holds it depressed for less than 500 milliseconds, or such other time as may be appropriate) then the sound tag, if any, associated with that key is played back (1404). However if the user holds (1406) the key down past the time threshold, then the previously programmed command playback (1408) occurs.

It will be appreciated that in both embodiments described above, the sound tag data that is played back may be user voice input as described in conjunction with FIG. 12, may be downloaded into the remote control either alone or in conjunction with other data such as program guide information, may be dynamically downloaded to match the current context of a controlled device, may be preset at the factory or by an installer, etc. It will be further appreciated that many other technologies for implementing double function keys are also possible, for example capacitive or resistive sensing of an initial touch by a user's finger involving no mechanical input, single tap/double tap user input, two-way rocker switches, etc. Accordingly the above described embodiments are by way of example only and are not intended to be limiting.

Figure 7:
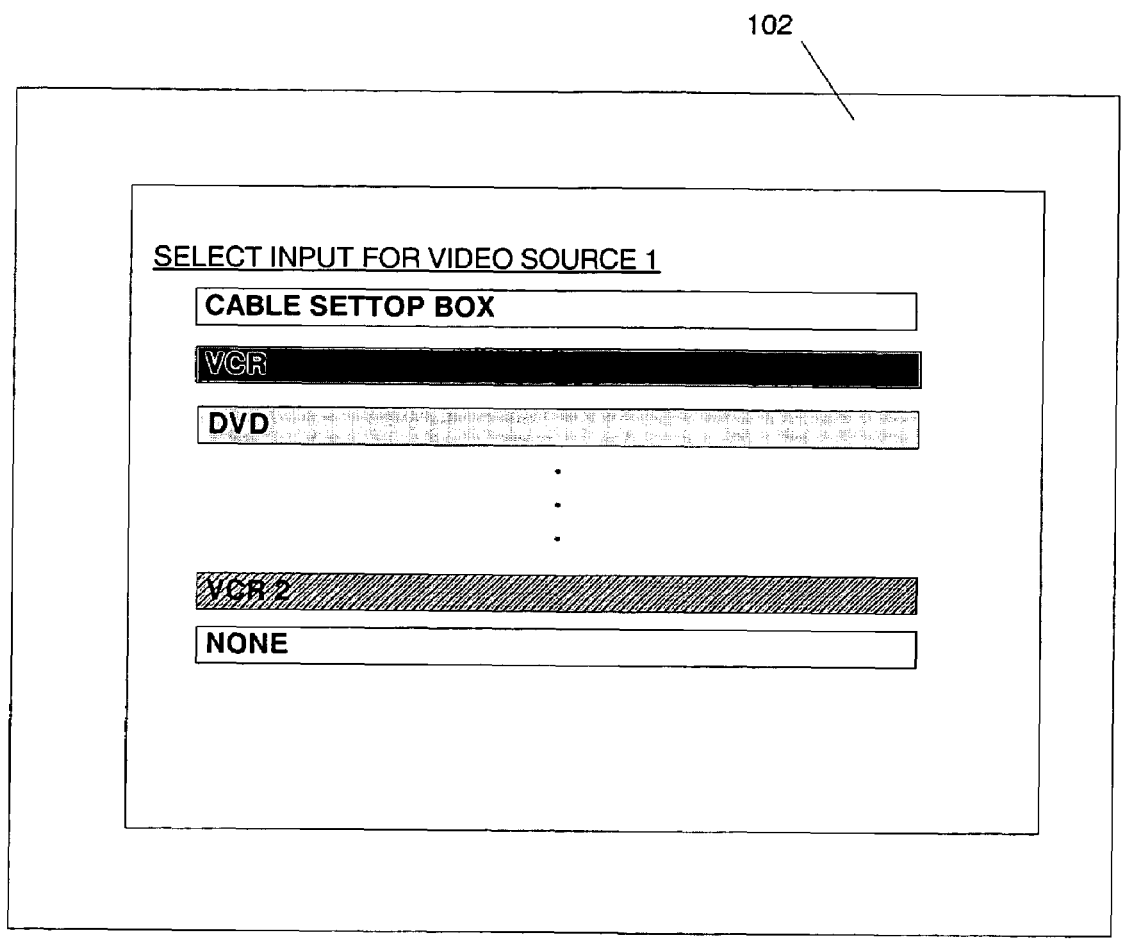
FIG. 7 illustrates an exemplary television input selection menu display in which video source choices are color coordinated with the controlling device function keys.

With reference to FIGS. 1 and 7 visual and/or audio cues may also be utilized in connection with appliance setup processes. For example, in some cases an appliance (e.g., television 102) may be setup to receive input(s) from one or more appliances (e.g., audio-visual input from cable box 104 and/or VCR 106). In such a case, in connection with the receiving appliance being setup to designate input or transmitting appliance(s), cues may be presented to the user that function to represent the transmitting appliance(s) (e.g., a Cable source may be provided with a yellow cue, a VCR source may be provided with a green cue, a DVD source provided with a blue cue, etc. as illustrated in FIG. 7). The cues provided to represent the transmitting appliances during setup processes may be pre-selected and/or user selectable.

The cues utilized to represent the transmitting appliances during an appliance setup process may then be used to represent an intended target appliance for function keys (and device modes) of the controlling device 100. For example, in the example illustrated in FIG. 7, the VCR is provided with a green colored cue which is utilized to represent the VCR during the appliance setup process. Accordingly, the same green colored cue may be associated with function keys of the controlling device 100 that have the VCR as an intended target appliance. In certain cases, such as when the controlling device 100 is supplied with the appliance that is to be setup, it may be preferred to have the cue and appliance relationships predefined in both the controlling device 100 and the appliance to be setup to ensure consistency between the utilized cues. In certain other cases, cue/appliance relationships utilized during the setup process can be communicated from the appliance being setup to the controlling device 100 (for example using IR or RF transmissions). Such a communication may include data that functions to identify the appliance type of any selected inputs and the cues associated with those appliance(s) whereby the controlling device 100 may use the data to set itself up to use the same cue to represent the same appliance(s) (i.e., in association with function keys when the appliance is to be an intended target appliance and/or in association with a device mode key to which the appliance has been assigned).

While various concepts have been described in detail, it will be appreciated by those skilled in the art that various modifications and alternatives to those concepts could be developed in light of the overall teachings of the disclosure. For example, it should be appreciated that particularly where controlling devices having multi-color display screens are involved (i.e., PDA or other LCD based controlling devices), many combinations and variations of the above described function key association features are possible without departing from the spirit and scope of the present invention. As such, the particular concepts disclosed are meant to be illustrative only and not limiting as to the scope of the invention which is to be given the full breadth of the appended claims and any equivalents thereof.

All documents cited within this application for patent are hereby incorporated by reference in their entirety.

What is claimed is:

1. A controlling device having a plurality of different operating modes for commanding operating functions of a plurality of different appliances, comprising:

a plurality of function keys wherein each of the plurality of function keys is used to control at least one operating function associated with at least one of the plurality of different appliances in each of the plurality of different operational modes wherein each of the plurality of function keys has a fixed first indicia indicating a controllable operating function associated with the function key and a variable second indicia indicating at least one of the plurality of different appliances associated with the function key; and a controller for controlling the second indicia wherein the second indicia is based upon a one of the plurality of different operating modes selected and wherein the controller initiates a control signal transmission for at least one of the plurality of different appliances based upon the one of the plurality of different operating modes selected and the controllable operating function associated with a one of the plurality of function keys activated.

2. The controlling device as recited in claim 1, wherein each of the plurality of different operating modes is associated with one of a plurality of users each being uniquely identifiable to the controlling device by means of input provided to the controlling device.

3. The controlling device as recited in claim 1, wherein each of the plurality of different operating modes is associated with one of a plurality of rooms each being uniquely identifiable to the controlling device by means of input provided to the controlling device.

4. The controlling device as recited in claim 1, wherein the plurality of function keys comprises hard keys.

5. The controlling device as recited in claim 3, comprising an LED associated with each of the plurality of function keys, the LED being illuminable to provide the second indicia.

6. The controlling device as recited in claim 5, wherein the LED is a multicolor LED.

7. The controlling device as recited in claim 1, wherein each of the plurality of function keys overlays a transparent, light conducting material and the light conducting material has an associated LED for illuminating the light conducting material to provide the second indicia.

8. The controlling device as recited in claim 7, wherein the LED is a multi-color LED.

9. The controlling device as recited in claim 1, wherein the second indicia comprises a sound tag.

10. The controlling device as recited in claim 1, wherein the second indicia comprises a tactile tag.

11. The controlling device as recited in claim 1, wherein the second indicia comprises a visual indicia.

12. The controlling device as recited in claim 11, wherein the second indicia is at least one selected from the group consisting of color, tint, contrast, pattern, shape and brightness.

13. The controlling device as recited in claim 11, wherein the plurality of function keys comprises displayed soft keys.

14. The controlling device as recited in claim 13, wherein each of the plurality of function keys is displayed using the second indicia.

15. The controlling device as recited in claim 13, wherein an area in the vicinity of each of plurality the function keys is provided the second indicia.

16. The controlling device as recited in claim 11, comprising an EL display having the plurality of function keys which is illuminable to provide the second indicia.

17. The controlling device as recited in claim 11, wherein the second indicia for each of the plurality of different operating modes is user-selectable.

18. The controlling device as recited in claim 11, wherein the second indicia for each of the plurality of different operating modes is predefined.

19. In a controlling device having a plurality of different operating modes for command operating functions of a plurality of different appliances and a plurality of function keys wherein each function key is used to control at least one operating function associated with at least one of the plurality of different appliances in each of the plurality of different operational modes and wherein each of the plurality of function keys has a fixed first indicia indicating a controllable operating function associated with the function key and a variable second indicia indicating at least one of the plurality of different appliances associated with the function key, a method for using the second indicia to indicate a configuration of the controlling device, comprising:

accepting input to create the plurality of different operational modes such that activation of function keys within the plurality of function keys will cause commands associated with a currently active one of the plurality of different operational modes to be transmitted to an intended one or more of the plurality of different appliances that were associated with the currently active one of the plurality of different operational modes and each of the plurality of function keys by means of the input;

associating one of a plurality of second indicia with each of the plurality of different operational modes whereby each of the plurality of different operational modes is discernable by a user; and presenting to the user the plurality of function keys with a one of the plurality of second indicia wherein the one of the second indicia presented is based on the currently active one of the plurality of different operational modes to thereby provide to the user an indication of the at least one of the plurality of different appliances to be currently controlled via the plurality of function keys in the currently active one of the plurality of different operational modes.

20. The method as recited in claim 19, wherein the second indicia is at least one selected from the group consisting of color, tint, contrast, pattern, shape and brightness.

21. The method as recited in claim 19, comprising illuminating at least one LED to present the second indicia.

22. The method as recited in claim 21, wherein the at least one LED is a multicolor LED.

23. The method as recited in claim 22, comprising using the LED to illuminate a display face of the controlling device.

24. The method as recited in claim 23, wherein the display face comprises a translucent material.

25. The method as recited in claim 19, wherein the plurality of different operational modes are associated with a corresponding one of a plurality of users each uniquely identifiable to the controlling device by means of further input provided to the controlling device.

26. The method as recited in claim 19, wherein the plurality of different operational modes are associated with a corresponding one of a plurality of rooms each uniquely identifiable to the controlling device by means of farther input provided to the controlling device.

27. The method as recited in claim 19, comprising illuminating an EL display segment to present the second indicia.

28. The method as recited in claim 19, comprising accepting user input to associated one of the plurality of second indicia with each of the plurality of different operational modes.

29. The method as recited in claim 19, wherein the second indicia for each of the plurality of different operational modes is predefined at the time of association.

30. The method as recited in claim 19, comprising accepting user input that functions to cause the second indicia to be presented.

* * * * *